July 28, 1959   J. S. PRICE   2,896,858
TELESCOPING IRRIGATION APPARATUS
Filed July 5, 1955   5 Sheets-Sheet 1
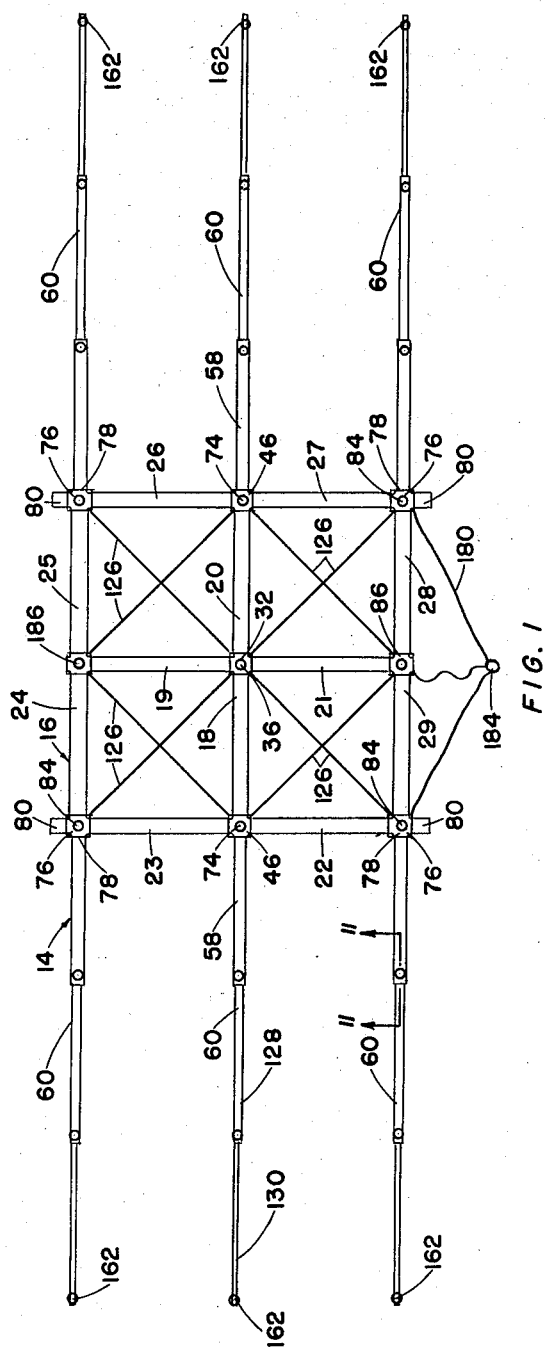
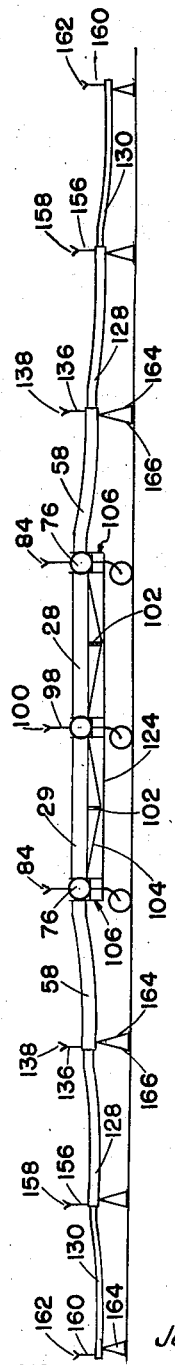
INVENTOR.
Joel S. Price
BY
Jerry J. Dunlap
ATTORNEY July 28, 1959 J. S. PRICE 2,896,858
TELESCOPING IRRIGATION APPARATUS Filed July 5, 1955 5 Sheets-Sheet 2

INVENTOR.
JOEL S. PRICE
BY
ATTORNEY

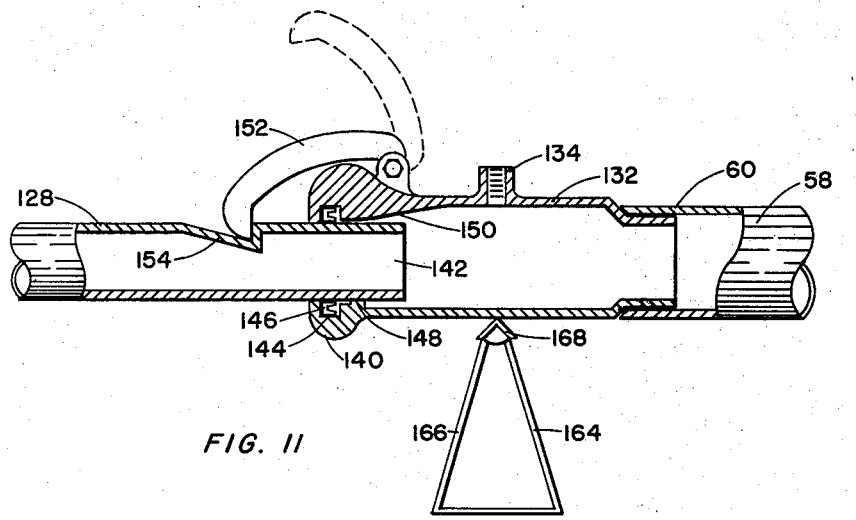
FIG. 11
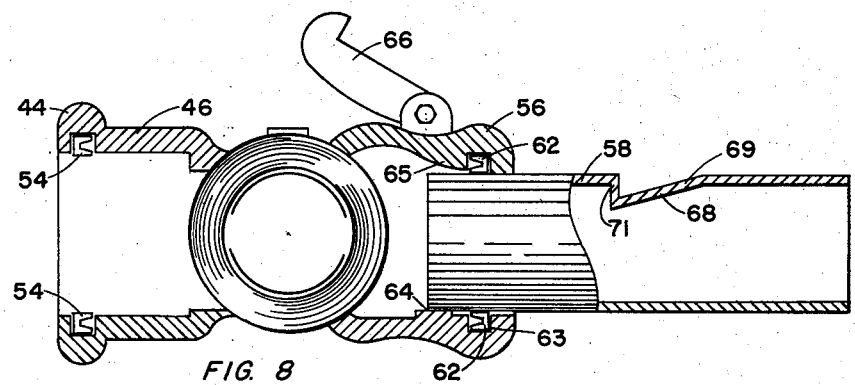
FIG. 8
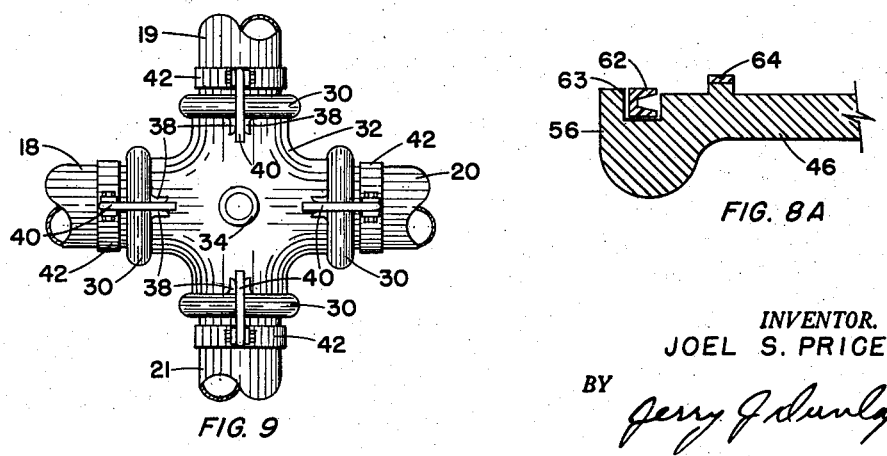
FIG. 8A
FIG. 9
INVENTOR.
JOEL S. PRICE July 28, 1959 J. S. PRICE 2,896,858
TELESCOPING IRRIGATION APPARATUS
Filed July 5, 1955 5 Sheets-Sheet 5

INVENTOR.
JOEL S. PRICE
BY
ATTORNEY

United States Patent Office 2,896,858
Patented July 28, 1959

2,896,858

TELESCOPING IRRIGATION APPARATUS

Joel S. Price, Oklahoma City, Okla.

Application July 5, 1955, Serial No. 519,947

3 Claims. (Cl. 239—212)

This invention relates to improvements in irrigation apparatus, and more particularly, but not by way of limitation, an improved portable irrigation apparatus having telescoping distribution lines. This application is an improvement over applicant's co-pending application entitled "Irrigation Apparatus," Ser. No. 490,903, filed Feb. 28, 1955.

In irrigating a field, it is common practice to lay a main irrigation line of relatively large diameter, such as 6 inches, down the center of the field along its longest dimension. These main lines are provided with special T-valve couplers, usually every 60 feet, to facilitate connection of lateral lines. The main lines are, of course, connected to a source of water supply, such as an irrigation well. A lateral line of slightly smaller diameter, and of a length to extend from the main line to substantially the edge of the field, is connected to one of the end T-valve couplers. The lateral line is provided with a plurality of sprinklers spaced substantially every 30 feet to irrigate a strip of land from 40 to 60 feet in width and extending over one-half the width of the field.

After one strip of land has been irrigated, the lateral line is moved to the next T-valve coupler for irrigating an adjacent strip of land. The laterals are sometimes moved by hand, however, each lateral line may be supported by a plurality of wheels secured around the lateral in aligned and spaced relation to facilitate moving the laterals. When using a wheel type move, large wrenches must be used for rolling the lateral to its various positions and, in the usual case, the services of at least two men are required. In this type of installation, separate lateral lines must be provided for each side of the main line since the laterals can be moved only along the length of the field and cannot be switched to the opposite side of the main line.

The principal shortcomings of the present-day irrigation apparatuses lie in the difficulty of moving the laterals, and the effect of wind on the laterals, as well as the effect of wind on the water sprays dispensed by the sprinklers. As mentioned above, it ordinarily requires the services of at least two men for moving a lateral. Furthermore, after the apparatus has been in operation, the soil is wet and muddy to add to the difficulty of moving the lateral when the lateral is moved either by hand or wheels. It will be apparent that when the workmen walk in the wet and muddy soil, the crops will be damaged. During periods of high winds, the wheel supported laterals are frequently blown loose from the main line and rolled down the length of the field, resulting in substantial damage to the irrigation apparatus. In addition, during variations in wind velocity, the sprays coming from the sprinklers are blown in various directions to frequently leave dry strips in the field and multiple irrigation of other strips. Furthermore, the wheel-supported laterals are extremely difficult to move over rolling or uneven terrain.

The present invention contemplates a novel irrigation apparatus for more effectively and efficiently irrigating a field. It is contemplated to provide a square or rectangular shaped portable apparatus by utilizing the irrigation pipes or conduits as the main frame of the apparatus, as well as for conducting the irrigating water. It is also contemplated to provide telescoping distribution lines extending from the main frame of the apparatus in such a manner that the distribution lines may be conveniently telescoped into the main frame for moving the apparatus to its various irrigating positions. With the present apparatus, a large area of ground may be irrigated in one position of the apparatus, and the entire apparatus may be conveniently moved to various locations. The apparatus will not be substantially affected by wind, and the sprays of water may be retained in a uniform fashion during varying wind velocities. In using the present apparatus, a substantial saving will be realized in the length of the main irrigation line, as well as the lateral lines and the number of valves required for the main line.

The present invention also contemplates a novel structure for telescoping pipes, wherein the pipes may be easily and efficiently extended or retracted without damage to the sealing means carried in the pipes. The telescoping pipes will be efficiently sealed when a fluid is forced therethrough, yet the pipes may be telescoped together without an undue force. When the pipes are extended, a novel locking mechanism provides an automatic connection of the smaller pipe with a surrounding larger pipe to prevent separation of the pipes, and to properly align the pipes in the desired relative angular positions.

An important object of this invention is to facilitate the irrigation of large fields.

Another object of this invention is to provide a novel irrigation apparatus utilizing the flow conduits as the interconnecting and supporting means for the apparatus.

A further object of this invention is to provide an irrigation apparatus which will not be materially affected by wind, yet is portable for convenient moving to various locations.

Another object of this invention is to irrigate large fields with a minimum of expense and with a minimum of manpower.

Another object of this invention is to provide a portable irrigation apparatus which may be easily moved over uneven terrain without damage to the apparatus, and which will obtain an even distribution of the irrigating fluid.

A still further object of this invention is to provide a novel telescoping pipe construction wherein a smaller pipe being telescoped from a larger pipe will be automatically engaged with the larger pipe at a predetermined time and in a predetermined angular position with respect to the larger pipe.

And another object of this invention is to provide a portable irrigation apparatus having a main frame with telescoping distribution lines extending from the main frame, wherein the distribution lines may be telescoped into the frame for transporting the apparatus.

Other objects and advantages of the invention will be evident from the following detailed description, when read in conjunction with the accompanying drawings which illustrate my invention.

In the drawings:

Figure 1 is a plan vew of the complete irrigation apparatus illustrating the distribution lines in extended positions.

Figure 2 is an elevational view of the apparatus as it appears in Figure 1.

Figure 8 is a sectional view as taken substantially along lines 8—8 of Figure 6.

Figure 8A is an enlarged partial view of the pipe socket and sealing ring as shown in Figure 8.

Figure 9 is a plan view of the center connector of the apparatus.

Figure 11 is a sectional view as taken along lines 11—11 of Fig. 1 and is a typical sectional view through one of the distribution lines.

Figure 3:
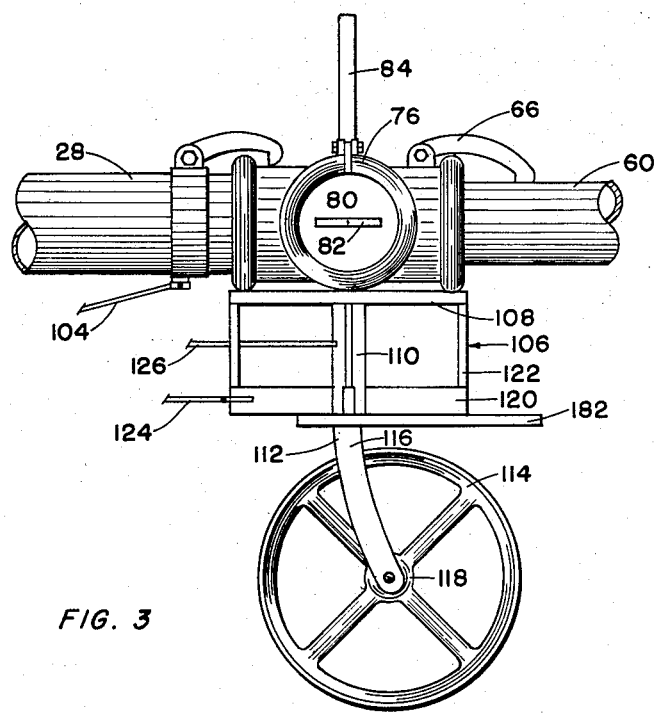
Figure 3 is a typical elevational view of one of the supporting castor assemblies for the apparatus.

Referring to the drawings in detail, and particularly Figures 1 and 2, reference character 14 generally designates my novel irrigation apparatus comprising a main frame, generally designated at 16, and formed out of a plurality of interconnected irrigation pipes 18 through 29. The pipes 18 through 21 extend outwardly from the communicating sockets 30 of a cross-type irrigation pipe fitting 32 as shown in detail in Figure 9. The fitting 32 may be of the type ordinarily used in irrigation piping, and is provided with a threaded nozzle 34 in the upper central portion thereof for receiving the riser (not shown) of a suitable sprinkler 36. Each pipe socket 30 of the cross 32 has a pair of circumferentially spaced lugs 38 formed on the upper surface thereof to receive a pawl 40 extending from the respective irrigation pipe. Each of the pipes 18 through 21 has a strap or bracket 42 secured on the inner end portion thereof for pivotally supporting the respective pawl 40. Each pawl 40 is, of course, of a length to extend over the flange of the respective pipe socket 30 into a position between the respective lugs 38, whereby the respective irrigation pipe will be secured against outward movement or removal from the cross 32. As it will be understood by those skilled in the art, however, the pawls 40 will permit a flexing or pivoting of the irrigation pipes in the cross 32 through an angle of approximately 5°, as is common in irrigation pipe connections.

Figure 6:
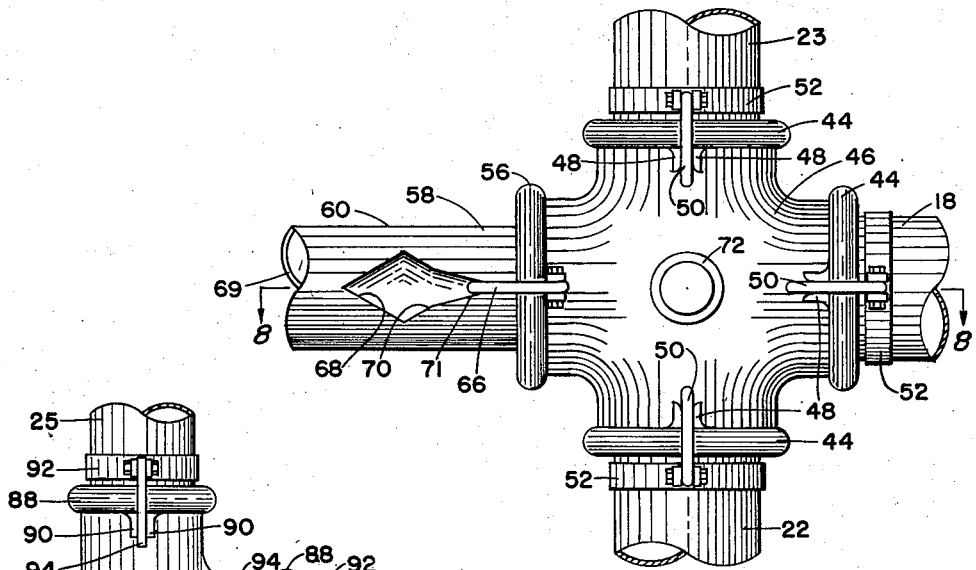
Figure 6 is an enlarged plan view of one corner of the apparatus.

The outer end of the main frame irrigating pipe 18 extends into one of the sockets 44 of another pipe fitting or connector 46, as shown in detail in Figure 6. The fitting 46 also has two additional pipe sockets 44 extending at right angles to the socket 44 containing the pipe 18 to receive the adjacent ends of the main frame irrigation pipes 22 and 23. Each socket 44 has a pair of circumferentially spaced lugs 48 on the upper surface thereof to receive the outer end of a pawl 50 pivotally carried by the respective irrigation pipe. Each of the irrigation pipes 18, 22, and 23 has a strap or bracket 52 secured thereon for pivotally carrying the respective pawl 50. Thus, each of the irrigation pipes 18, 22, and 23 is secured in communicating relation in the fitting 46. Also, each socket 44 (see Figure 8) has a suitable sealing ring 54 in the inner periphery thereof to contact the respective irrigation pipe, and each socket 44 is of a size to permit a pivotal or flexing movement of the respective irrigation pipe therein in a manner similar to the pivotal connection and arrangement of the pipes 18 through 21 in the cross-fitting 32 as previously described.

The fitting 46 also has an additional socket 56 extending in alignment with the pipe 18 and communicating with all of the sockets 44. The socket 56 is preferably smaller in diameter than the sockets 44 to receive the largest pipe section 58 of a telescoping distribution line 60. The pipe 58 is of a size to telescope into the pipe 18 of the main frame 16 and extends outwardly from the frame 16 for distributing the irrigation fluid, as will be more fully hereinafter set forth. The inner diameter of the pipe socket 56 is of a size to closely receive the distribution pipe 58 and has a substantially U-shaped sealing ring 62 secured therein. The sealing ring 62 (see Figure 8A) is disposed in a circumferential groove 63 and preferably faces in a direction to receive the pressure of the irrigation fluid therein, whereby the irrigation fluid expands the sealing ring inwardly into sealing contact with the outer periphery of the pipe 58.

A semi-circular shaped projection 64 extends upwardly from the inner periphery of the socket 56 inwardly of the sealing ring 62 to support the pipe 58. The projection 64 is of a height to retain the pipe 58 out of close contact with the lower portion of the sealing ring 62 when the sealing ring is in a non-expanded condition. However, the projection 64 retains the pipe 58 sufficiently close to the sealing ring 62 that when the sealing ring is expanded, it will closely contact the periphery of the pipe 58 and prevent a leakage of fluid around the pipe. The upper inner periphery 65 of the socket 56 is increased in diameter inwardly of the sealing ring 62, thereby permitting a limited pivotal or flexing movement of the pipe 58 on the shoulder or projection 64. The socket 56 also has a pawl 66 pivotally secured on the upper surface thereof for engaging an indentation 68 formed in the upper surface or crown portion of the distribution pipe 58.

As shown in Figure 6, the indentation 68 is shaped (when viewed in plan) in the form of an arrowhead with the outer end portion thereof tapered to a point 69. From the end 69, the indentation 68 extends outwardly in opposite directions over the surface of the pipe 58 and then inwardly to form tapered sides 70. The inner end 71 of the indentation 68 is of a definite width, preferably corresponding to the thickness of the pawl 66. As will be observed in Figure 8, the indentation 68 is also progressively increased in depth from the outer end 69 to the inner end 71 thereof. The indentation 68 may be formed in any suitable manner, such as by stamping the upper surface of the pipe 58. Also, the indentation 68 may be suitably reenforced (not shown) if desired.

Referring to Figure 1, it will be apparent that another fitting 46 is secured on the outer end of the main frame irrigation pipe 20 to interconnect the pipes 20, 26, and 27. Furthermore, the fitting 46 on the end of the line receives the largest section 58 of another outwardly extending distribution line 60. Each of the fittings 46 is provided with a threaded nozzle 72 in the upper surface thereof to receive the riser (not shown) of a suitable sprinkler 74.

Each corner of the main frame 16 is provided with a fitting 76 (not shown in detail) corresponding in construction to the fittings 46 to interconnect the main frame lines and to receive the inner end of an additional outwardly extending distribution line 60. For example, in the lower left-hand corner of the frame 16, as viewed in Figure 1, the fitting 76 interconnects the main frame lines 22 and 29 and receives the inner end of the distribution line 60. Each fitting 76 is constructed with a nozzle or socket 78 corresponding in construction with the sockets 56 of the fittings 46 to telescopically receive the respective distribution line 60, whereby each of the distribution lines 60 may be telescoped through the respective fitting 76 into the main frame 16. The remaining socket of each fitting 76 not utilized by the main frame pipes is closed by a suitable cap 80 having a pawl (not shown) thereon for engaging the respective socket, whereby the fittings 76 will provide a closed flow path for irrigating fluid through the main frames 16 and into the distribution lines 60. Also, each cap 80 is preferably provided with a suitable handle 82, as shown in Figure 3, to permit easy removal of the caps 80. Any one of the caps 80 may be removed to provide an inlet to the frame 16, as will be more fully hereinafter set forth. It will also be observed that each fitting 76 is provided with a suitable sprinkler 84 on the upper surface thereof.

Figure 10:
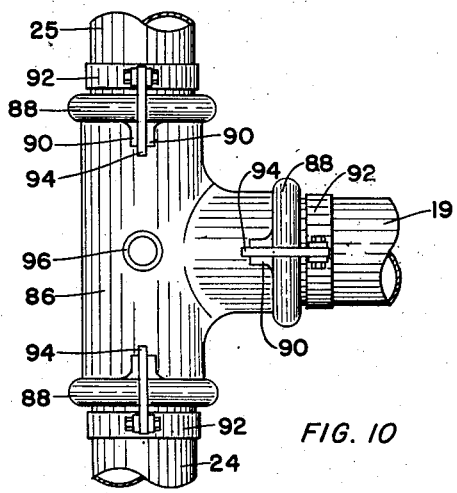
Figure 10 is a plan view of still another connector of the apparatus.

The main frame pipes 19, 24, and 25 are interconnected by a suitable T-shaped fitting 86 as shown in detail in Figure 10. The fitting 86 has three communicating sockets 88 to receive the respective ends of the main irrigation pipes 19, 24, and 25, and each socket 88 has a pair of circumferentially spaced lugs 90 on the upper surface thereof. The respective end portion of each pipe 19, 24, and 25 has a strap or band 92 rigidly secured thereon for pivotally supporting a pawl 94. Each pawl 94 is constructed similar to the pawls 50 for the fittings 46, and is of a length to extend over the respective pipe socket 88 into a position between the respective lugs 90. Therefore, each of the pipes 19, 24, and 25 is secured in the fitting 86 against outward movement. Also, each socket 88 of the fitting 86 is constructed in substantially the same manner as a common irrigation pipe fitting and is provided with a suitable seal (not shown) to provide a sealing contact around the respective pipe 19, 24, or 25 and permit a limited flexing or pivoting of the respective pipe. Furthermore, the fitting 86 is provided with a threaded socket 96 in the upper central surface thereof to receive the riser 98 (see Figure 2) of a suitable sprinkler 100.

Another T-shaped fitting 86 is provided to interconnect the adjacent ends of the main frame pipes 21, 28, and 29 as illustrated in the lower portion of Figure 1. It will be understood that the pipes 21, 28, and 29 are provided with straps and pawls (not shown) for engaging the fitting 86 and preventing outward movement of the pipes. Thus, the main frame 16 provides a continuous closed flow path for irrigation fluid and directs the irrigation fluid into the distribution lines 60.

It will be noted that each of the main frame pipes 18 through 29 is provided with a strap or band around each end thereof. Also, and as shown in Figure 2, each of the lines of the main frame 16 is provided with a drain conduit 102 depending from the central portion thereof. Each drain conduit 102 contains a suitable automatic drain valve (not shown) for draining the irrigation fluid from the respective main frame pipe when the pressure within the pipe has decreased to a specified minimum, such as 5 pounds. Each of the main frame lines is supported or braced by a cable 104 extending from the bands at each end thereof downwardly through the lower end of the respective drain conduit 102. The cables 104 are preferably provided with turnbuckles (not shown) for maintaining any desired tension on the cables and retaining the main frame lines in straight positions.

Each of the main frame fittings 32, 46, 76, and 86 is supported by a castor assembly generally designated at 106 and shown in detail in Figure 3. Each castor assembly 106 has an upper bed plate 108 of substantially square or rectangular configuration and of a size to support the respective pipe fitting. For example, and as illustrated in Figure 3, the respective bed plate 108 is of a size to extend underneath the opposed socket flanges of the pipe fitting 76 to support the fitting 76 in a horizontal position. However, the bed plate 108 should not extend a substantial distance beyond any of the pipe sockets of the respective fitting, inasmuch as the bed plate would then interfere with the coupling and uncoupling of the various pipes into the fitting. One or more suitable U-shaped straps (not shown) extends from the bed plate 108 over the respective fitting to rigidly secure the fittings on the castor assemblies 106.

The bed plate 108 is provided with a pipe or sleeve 110 extending downwardly from the central portion thereof to slidingly receive the standard 112 of a castor wheel 114. The standard 112 extends upwardly from a yoke 116 which, in turn, extends through the hub 118 of the wheel 114. It will be observed in Figure 3 that the yoke 116 is bent to offset the wheel 114 from the standard 112 and supporting sleeve 110, thereby providing for a turning movement of the yoke 116 and wheel 114 when the respective bed plate and pipe fitting is pulled in various directions. The sleeve 110 is provided with a plurality of circumferentially spaced arms 120 extending radially outward from the lower end thereof. The outer end of each arm 120 is, in turn, interconnected to the bed plate 108 by a vertical rod 122. Therefore, the sleeve 110 will be retained in a vertical position to receive the standard 112 and properly support the yoke 116.

The various castor assemblies 106 are braced for retaining the main frame 16 in assembly in two different ways. Firstly, each arm 120 is interconnected to an arm 120 of an adjacent castor assembly 106 by a cable 124 extending underneath the respective main frame pipe, as illustrated in Figures 2 and 3. Secondly, cables or wires 126 extend in crossed relation, as illustrated in Figures 1 and 3, between the sleeves 110 of the various castor assemblies 106. It will thus be apparent that the cables 124 and 126 will assume a substantial portion of the stress imposed between various fittings of the main frame 16 to relieve the stresses imposed on the main frame pipes 18 through 29 and their interconnecting pawls, to prevent accidental separation of the frame.

Each distribution line 60 (Figures 1 and 2) comprises a plurality of telescoping sections 58, 128, and 130. As previously described, each of the larger sections 58 of each distribution line 60 is telescoped into and sealed in the respective fitting 46 or 76. The outer end of each section 58 (see Figure 11) is provided with a coupling 132 having a threaded nozzle 134 in the upper surface thereof. Each nozzle 134 receives the riser 136 (see also Figure 2) of a suitable sprinkler 138. Each coupling 132 has a flanged nozzle 140 on the outer end thereof of a size to receive the inner end 142 of the respective distribution line section 128. Each nozzle 140 has a circumferential groove 144 in the inner periphery thereof for receiving a sealing ring 146. The sealing ring 146 provides a seal around the respective pipe section 128 and faces inwardly toward the main frame 16 to expand upon the exertion of fluid pressure in the respective coupling 132. Also, each nozzle 140 has a semicircular projection 148 on the lower inner surface thereof of the same nature as the projections 64 of the pipe fittings 46 to support the end 142 of the respective pipe 128. Thus, the pipes 128 may be easily telescoped into the respective couplings 132 and larger pipe sections 58 without damage to the respective seal 146.

The upper inner periphery 150 of each coupling 132 is tapered upwardly and inwardly from the groove 144 in the same manner as the upper inner surface 65 of the nozzles 56 of the fittings 46, to permit a limited pivotal movement of the pipes 128 in the fittings 132. A suitable pawl 152 is pivotally secured to the upper surface of each coupling 132 and is of a size to extend outwardly over the flanged nozzle 140 into engagement with an indentation 154 formed in the upper surface of the respective pipe 128. The indentations 154 are formed in the same manner as the indentations 68 in the pipes 58 to receive the pawls 152 upon outward telescoping movement of the pipes 128 out of the pipes 58 and to angularly align the pipes 128 with pipes 58.

The outer end of the pipe 128 is provided with a similar coupling (not shown in detail) having a riser 156 (Figure 2) and a sprinkler 158 extending upwardly therefrom and to receive the inner end of the respective pipe section 130. Also, of course, the inner end of the pipe section 130 is provided with an indentation (not shown) to receive the pawl of the respective coupling for limiting the outward movement of the pipe sections 130 and to align the pipe sections 130 with the pipe sections 128 and 58. The outer end of the smallest pipe section 130 is suitably capped and provided with an upwardly extending riser 160 having a sprinkler 162 on the upper end of the riser.

Figure 5:
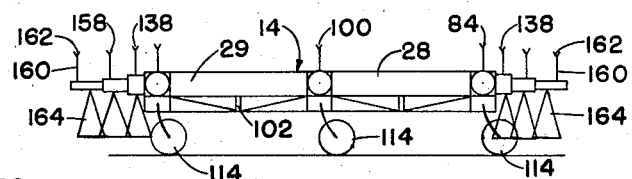
Figure 5 is a side elevational view of the complete apparatus with the distribution lines retracted or telescoped into the main frame.
Figure 4:
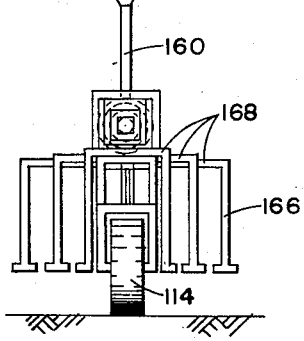
Figure 4 is an end elevational view of one of the distribution lines, illustrating the arrangement of the supports for the sections of the distribution lines when the distribution lines are retracted.
Figure 7:
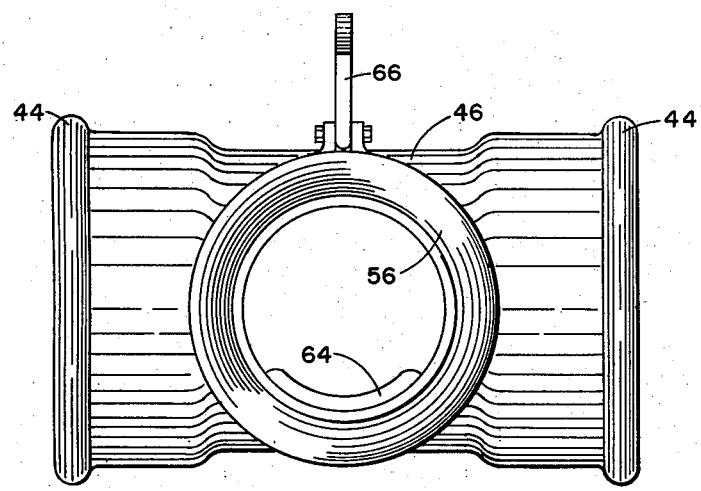
Figure 7 is an elevational view of the fitting or connector shown in Figure 6.

Each section of each distribution line 60 is provided with a suitable support 164 to retain the distribution lines out of contact with the soil. The supports 164 may consist of a pair of triangular shaped legs 166 secured on opposite sides of the respective pipe section. As illustrated in Figure 11, the legs 166 may be conveniently secured to a transverse supporting member 168 secured to the lower surface of the respective coupling on the outer end of the respective pipe section. Also, and as illustrated in Figure 4, the legs 166 are disposed a substantial distance on opposite sides of the respective pipe section of the distribution line to prevent turning or tipping of the distribution line during operation of the irrigation apparatus 14. Furthermore, the lateral or transverse spacing of the adjacent legs 166 is preferably varied to permit a partial telescoping of the supports 164 when the distribution lines 60 are telescoped into the main frame 16 as illustrated in Figures 4 and 5.

Operation

Figure 12:
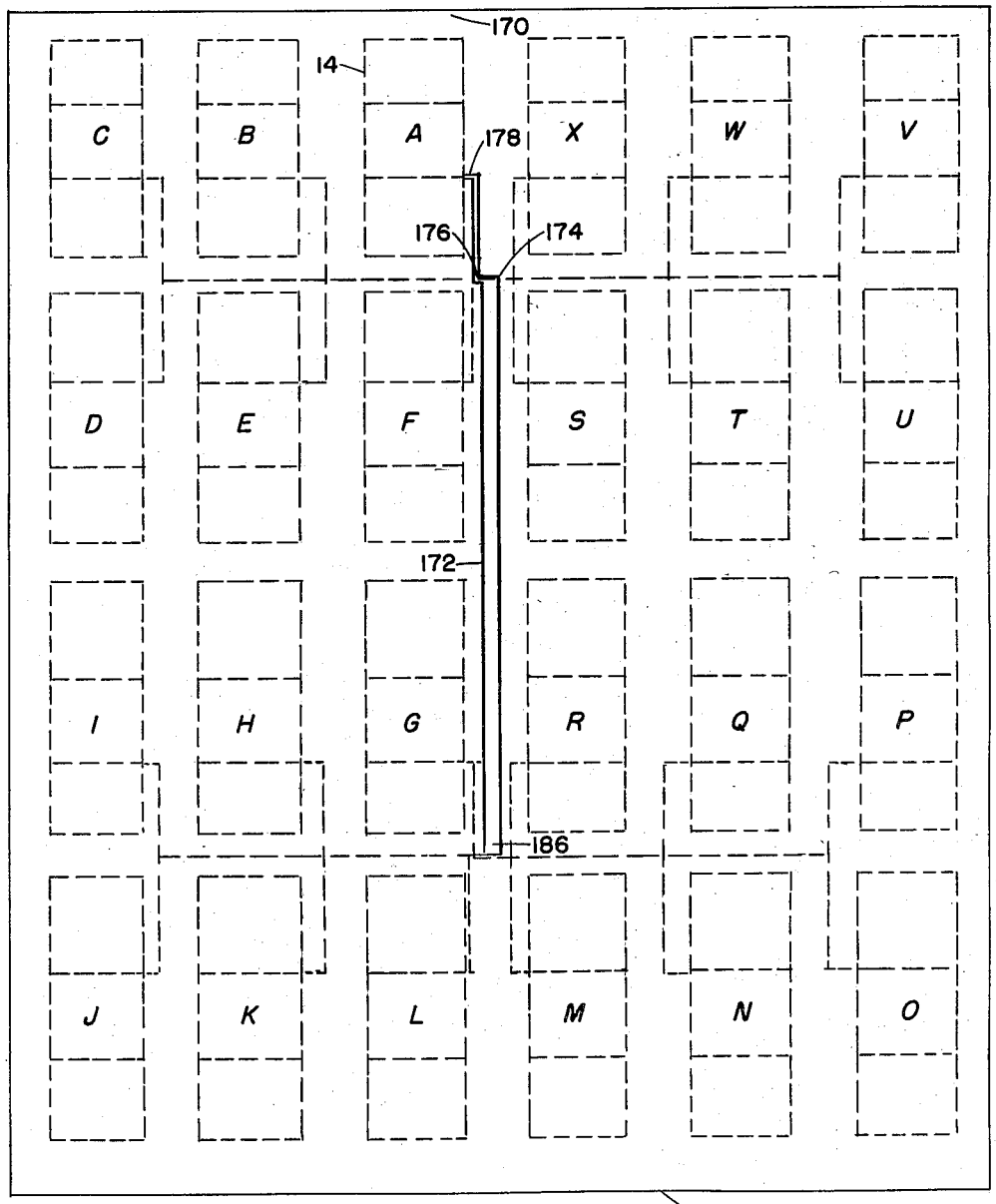
Figure 12 is a diagrammatic plan view of a large field, as well as the connection of the apparatus to a main irrigation line.

The operation of the apparatus 14 is diagrammatically illustrated in Figure 12, wherein reference character 170 designates a large field, such as a wheat field or the like, having a main irrigation line 172 extending down the center thereof. The main line 172 is connected to a source of irrigation water (not shown). The apparatus 14 is first positioned beyond one end 174 of the main line 172 and to one side of the main line, with the telescoping distribution lines 60 extending parallel with the main line 172. The specific distance between the apparatus 14 and the end 174 of the main irrigation line 172 will depend upon the spraying radius of the various sprinklers on the apparatus 14. For example, if the various sprinklers are of a size to disperse the irrigating water over a radius of 20 feet, the sprinkler 162 closest to the main line 172 will be positioned 20 feet to the side of and 20 feet beyond the end 174. Thus, the apparatus 14 will spray the irrigation water to a line extending longitudinally from the main line 172.

In connecting the apparatus 14 to the main line 172, the cap 80 of the fitting 76 nearest the end 174 of the main irrigation line 172 is removed. The respective fitting 76 is then connected to the end 174 of the main irrigation line 172 through the use of a lateral line 176 and a short length of flexible conduit 178. The lateral 176 preferably extends from the end 174 into proximity with the fitting 76. The lateral 176 is then connected to the fitting 76 through the flexible conduit 178 to permit connection of the apparatus 14 to the main irrigation line 172 without a minute positioning of the apparatus 14. As illustrated in Figure 12, this position of the apparatus 14 is designated as position A.

When the apparatus 14 is in position A it will irrigate a large, substantially rectangular portion of the field 170 adjacent to the end 174 of the main irrigation line 172. Upon completion of the irrigating operation of the apparatus 14 in position A, the flexible conduit 178 is disconnected from the respective fitting 76. Each of the distribution lines 60 is then telescoped into the main frame 16. It will be observed in Figure 1 that each of the sections 58, 128, and 130 of each distribution line 60 is of a length less than or corresponding to the length of each of the main lines 18 through 29 of the main frame 16. Therefore, each distribution line 60 may be telescoped into the adjacent aligned pipe of the main frame 16 in the manner illustrated in Figures 4 and 5. When each distribution line 60 is fully telescoped into the main frame 16, the supports 164 will be raised above the surface of the earth to permit movement of the apparatus 14 on the castor assemblies 106.

A suitable bridle 180 is connected to straps 182 of the castor assemblies 106 on the left side of the apparatus 14 when viewed as in Figure 12. Each strap (see Figure 3) is pivotally secured around the standard 112 of the respective yoke 116, thereby permitting any desired angular position of the straps 182 with respect to the main frame 16. The outer end of the bridle 180 (Figure 1) is provided with a ring 184 which may be engaged by a tractor or the like (not shown) for moving the apparatus 14 from position A to position B. The castor wheels 114 will readily align themselves as the apparatus 14 is being moved from position A to position B to retain the damage to growing crops at a minimum. It should also be noted that the castor assemblies 106 are of sufficient height to retain the apparatus 14 above growing crops.

When the apparatus 14 has been moved to position B, the lateral 176 is extended as indicated by dotted lines in Figure 12 and the flexible conduit 178 is again connected to the lateral 176 and the adjacent fitting 76. Also, each distribution line 60 is extended or telescoped out of the main frame 16 to position the distribution lines as illustrated in Figures 1 and 2. As each distribution line section 58 is removed from its respective fitting 46 or 76, the respective pawl 66 (see Figure 6) of the fitting rides along the upper surface of the pipe 58. As each pipe 58 approaches its outermost position, the respective pawl 66 slides down into the respective indentation 68, and the outward movement of the pipe 58 is stopped when the pawl 66 contacts the inner end 71 of the respective indentation 68. When the pawl 66 is positioned in the end 71 of the indentation, the respective sprinkler 138 will be extended vertically in the proper position. It will be observed that the pawl 66 will contact the tapered side 70 (Figure 6) of the respective indentation 68 to guide the pipe 58 into the desired angular position for positioning the sprinklers 138 vertically as illustrated in Figure 2. The remaining sections 128 and 130 of each distribution line 60 are aligned in a similar manner to align each of the sprinklers 158 and 162 vertically. The irrigating operation is then repeated to irrigate another section of the field 170 adjacent to the previously irrigated section.

The apparatus 14 is moved sequentially to the positions indicated by the letters in Figure 12 from position A through position L, with the lateral line 176 being varied or reconnected to the lower end 186 of the main irrigation line 172 when the apparatus 14 is moved into position G. It will be apparent that the flexible coupling 178 is connected to the fitting 76 adjacent to the lateral line 176 in each position of the apparatus 14.

When the apparatus 14 reaches position L, it is moved beyond the end 186 of the main irrigation line 172 into position M. The apparatus 14 is then moved along the opposite side of the field 170 through the positions M through X in the sequence indicated by the letters. When the apparatus 14 has completed the irrigation of the field 170, it will be in the position X. It will then be apparent that the apparatus 14 can be moved to the left beyond the end 174 of the main irrigation line 172 into position A for repeating the irrigation operation.

From an observation of Figure 12, it will be observed that the main irrigation line 172 does not extend throughout the length of the field 170, as would be required by present-day irrigation apparatus. Also, in the size of field shown, only two couplings are required on the main line 172 for connection of the lateral 176. The apparatus 14 may be constructed substantially any desired size, however, it is contemplated to use irrigation pipe in 40-foot sections for the main frame lines 18 through 29. With this size of apparatus, a field measuring approximately 720 feet by 1,440 feet may be irrigated by using only two T-valve couplers in the main irrigation line 172; whereas, approximately 24 T-valve couplers would be required in the main line to irrigate a similar sized field by present irrigating apparatus. It will also be observed that the precise location of the apparatus 14 can be varied as desired to accommodate the specific wind conditions which may be existing at any particular time. Thus, the apparatus 14 may be positioned to assure a complete irrigation of the field 170, yet prevent a multiple irrigation of various portions.

From the foregoing, it is apparent that the present invention provides a novel irrigation apparatus whereby the irrigation of large fields will be materially facilitated. The main frame of the apparatus also forms the flow path for the irrigating fluid, and the apparatus will not be substantially affected by wind. The apparatus may be conveniently moved to various positions and an even irrigation operation will be performed. It will also be apparent that the present invention provides a novel telescoping pipe construction whereby various sizes of pipes may be telescopically interconnected without leaks and in a manner in which the pipes may be easily telescoped into one another.

Changes may be made in the combination and arrangement of parts as heretofore set forth in the specification and shown in the drawings, it being understood that any modification in the precise embodiment of the invention may be made within the scope of the following claims without departing from the spirit of the invention.

I claim:

1. A portable apparatus for dispensing irrigation fluid, comprising a plurality of connectors having communicating pipe sockets therein, a castor assembly supporting each of said connectors, a plurality of irrigation pipes secured in a portion of said sockets of said connectors in communicating relation forming a substantially square frame for the apparatus and a flow path for the irrigation fluid, a plurality of telescoping pipes secured to said connectors and extending outwardly from said frame, said telescoping pipes being of a size to telescope through said connectors into the pipes of said frame, spray nozzles on said connectors and telescoping pipes, and support means on said telescoping pipes for supporting said telescoping pipes in raised positions when said telescoping pipes are extended from said frame.

2. In an irrigation apparatus, a first irrigation pipe, a coupler on the outer end of said first pipe, a second irrigation pipe of a size to telescope through said coupler and said first pipe, said second pipe having an indentation in the outer periphery thereof adjacent its inner end, the inner end portion of said indentation having its side walls tapered inwardly toward the inner end of said second pipe and said indentation being increased in depth from its outer end to its inner end, a sealing ring in said coupler of a size to sealingly engage the outer surface of said second pipe, and a latch pivotally secured on the top of said coupler and being of a length to extend over the end of said coupler and ride on the crown of said second pipe, whereby said latch engages said indentation upon outward movement of said second pipe for limiting the outward movement of said second pipe and angularly aligning said second pipe with respect to said coupler.

3. An irrigation pipe coupler for telescopically receiving an irrigation pipe, comprising a body having a passageway therethrough of a size to receive the pipe, said body having an internal circumferential groove in one end of said passageway, and a sealing ring in said groove, said body also having a projection in the bottom of said passageway inwardly of said groove extending upwardly to a height above the lower portion of the inner periphery of said sealing ring to support the pipe above the bottom portion of said sealing ring upon telescoping movement of the pipe through said passageway, and the top of said passageway being tapered upwardly and inwardly from said groove to provide clearance above the pipe inwardly of said sealing ring, whereby said pipe may be pivoted in said passageway.

References Cited in the file of this patent

UNITED STATES PATENTS

| | | |
|---|---|---|
| 278,617 | Smith | May 29, 1883 |
| 378,672 | Gathright | Feb. 28, 1888 |
| 1,387,256 | Griffin | Aug. 9, 1921 |
| 2,144,890 | Nakaoka | Jan. 24, 1939 |
| 2,338,740 | Smith | Jan. 11, 1944 |
| 2,499,476 | Eyerly | Mar. 7, 1950 |
| 2,518,952 | Sohmer | Aug. 15, 1950 |
| 2,631,869 | Warp | Mar. 17, 1953 |
| 2,684,256 | Krukowski | July 20, 1954 |